May 9, 1944.  C. A. SAWTELLE  2,348,500

VEHICLE BRAKE

Filed April 10, 1943  3 Sheets-Sheet 1

Inventor
Charles A. Sawtelle

Attorney

May 9, 1944.  C. A. SAWTELLE  2,348,500
VEHICLE BRAKE
Filed April 10, 1943   3 Sheets-Sheet 2

Inventor
Charles A Sawtelle
By J.D. Murray
Attorney

May 9, 1944.  C. A. SAWTELLE  2,348,500
VEHICLE BRAKE
Filed April 10, 1943  3 Sheets-Sheet 3

Inventor
Charles A. Sawtelle
By
J. J. Murray
Attorney

Patented May 9, 1944

2,348,500

UNITED STATES PATENT OFFICE 2,348,500

VEHICLE BRAKE

Charles A. Sawtelle, Plymouth, Mich.

Application April 10, 1943, Serial No. 482,647

13 Claims. (Cl. 188—78)

This invention relates to brakes and more particularly multiple shoe brakes utilizing a fraction of the torque imposed by a drum on one shoe to apply a companion shoe to the drum.

An object of the invention is to provide a simple, reliable, and easily-installed device for transmitting fractional torque from one brake shoe to another and accurately predetermining the fraction of such torque.

Another object is to adapt said device to serve its purpose regardless of the direction of drum rotation.

A further object is to associate with the improved device an adjusting provision to compensate for wear of the friction-applying faces.

A further object is to interpose between adjoined ends of two brake shoes a member adapted to bodily float in unison with at least one of said shoes for transmitting torque to the other, and to predeterminedly resist such floating by a fixed element exercising a partial anchorage effect while limiting transmitted torque to a definite fraction of the torque available.

A further object is to interpose a floating wedge member between two brake shoes and adapt at least one of said shoes to float circumferentially of the brake for actuating the wedge member to apply a torque-induced braking effort to the other shoe, such actuation of the wedge member being resisted by a fixed element, functioning to increasingly insert the wedge member between the shoes responsive to such actuation.

These and various other objects are attained by the construction hereinafter described and illustrated by the accompanying drawings, wherein.

Figure 1:
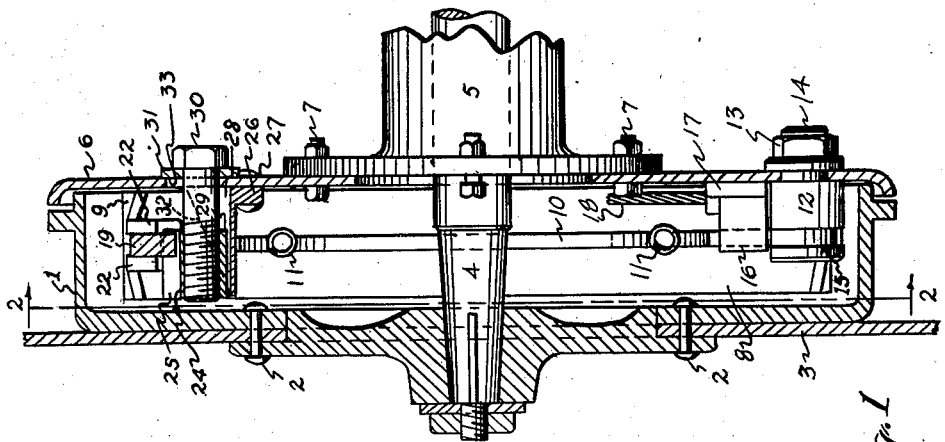
Fig. 1 is a diametrical sectional view of the improved brake, taken on the line 1—1 of Fig. 2.

Describing these views now in greater detail and referring first to the construction shown in Figs. 1 to 5, the reference character 1 designates a vehicle brake drum rigidly secured by rivets 2 to a wheel 3 fixed on a live axle 4 projecting from the usual housing 5. The usual backing plate 6 is bolted at 7 to said housing, exercising usual functions of mounting parts within the drum and closing the open side of the latter.

A pair of substantially semi-cylindrical complementary brake shoes is installed within the drum, each comprising an outer member 8 of band form equipped with usual lining 9, and a web member 10 inwardly projecting from the band member and also projecting some distance beyond the ends of the latter. The shoes are interconnected by coiled springs 11, being thus normally retracted from the drum rim.

Interposed between two corresponding ends of the shoes is an anchorage pin 12 fixed on the backing plate by a nut 13 engaging a stud portion 14 of said pin, the latter having an annular groove 15 wherein the web portions of the shoes are normally anchored. Further engaged between said ends of the shoes is a cam 16 for spreading the shoes, said cam being fixed on one end of an actuating arm 17, adapted to be rocked by a cable 18 or other suitable provision. When the cam takes effect on the shoe ends normally seating against the pin 12, the shoes are swung about their other ends hereinafter termed the pivotal ends.

Interposed between the pivotal ends of the shoes and gripped by the latter under stress imposed by the springs 11, is a torque-transmitting wedge member 19, adapted to float both radially and circumferentially in regulating transmitted torque, and also radially adjustable to compensate for wear of the linings 9. Opposite edge faces 20 of said member receive the retractive thrust of the shoes, said faces converging symmetrically as they extend toward the drum rim. As will presently appear, said wedge member occupies a definitely fixed position when the shoes are retracted and hence determines extent of retraction of the shoes. The webs of the shoes have considerably thickened end portions 21 to abut said wedge member and such portions are formed with pairs of lips 22 straddling the wedge member to maintain it in the plane of the shoe webs. The wedge member has an elongated edge facing toward the axis of the brake and formed with two recesses 23 of shallow inverted V-shape, such recesses being similarly adjacent to the shoe-engaging ends of the wedge member. This recessed edge seats the wedge member on a metal block 24 considerably exceeding the wedge member in thickness, the outer face of said block being formed with two ridges 25 spaced and shaped to fit nicely into the recesses 23, and thus providing seats for the wedge member. The block 24 seats toward the brake axis on a bracket 26 rigidly secured to the backing plate by rivets 27 or the like said bracket forming a channel 28 opening toward the block 24 which is formed with a rib 29 having a sliding fit in said channel to guide the block in an adjustment toward the backing plate. A screw 30 tapped into the ribbed mid portion of the block extends through the backing plate and is headed against a washer 31 exteriorly seating against the backing plate, said screw thus being adapted to adjust the block lengthwise of the channel 28 and transversely to the rotational plane. At opposite sides of said channel, the bracket 26 is formed with coplanar faces 32 diverging from the brake axis in extending toward the backing plate, and the block 24 is formed at opposite sides of its rib 29 with seating faces conforming to and engaging the faces 32. Thus when the screw 30 is rotated to shift the block toward the backing plate, this accomplishes an adjustment of the block toward the drum rim due to the inclined faces 32. An opening 33 of the backing plate accommodating the screw 30 is sufficiently elongated radially to permit of the described radial adjustment of the block and the thickness of the block is adequate to maintain its seat-forming relation to the wedge member.

Figure 2:
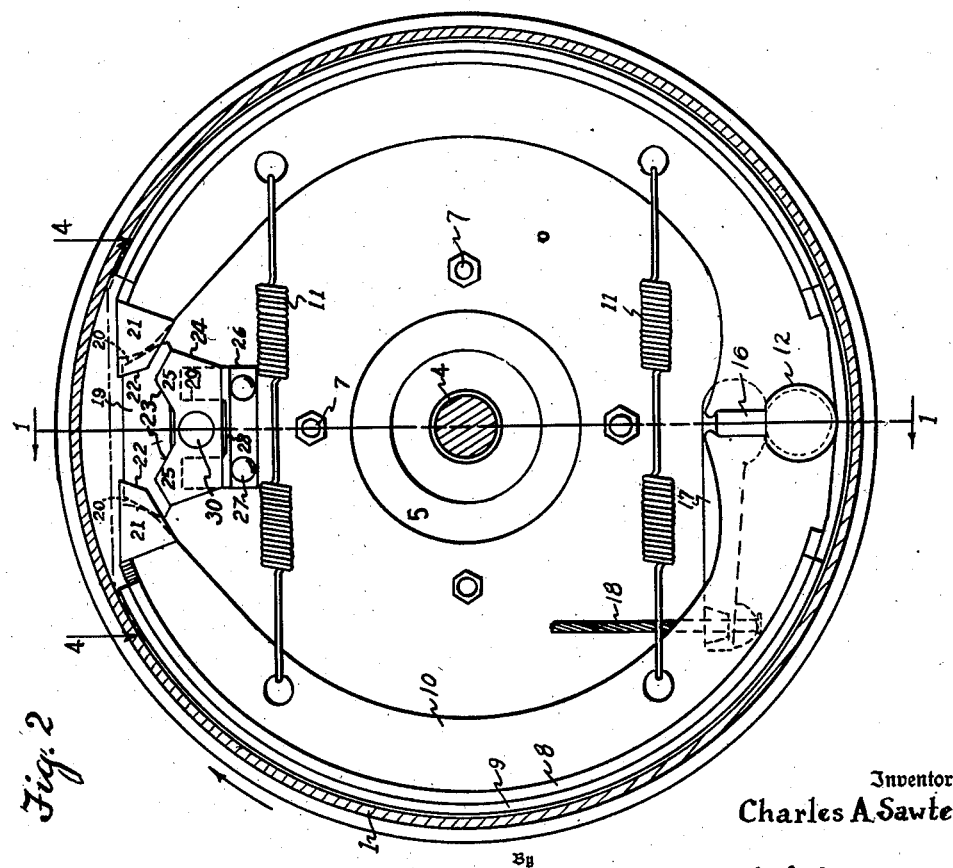
Fig. 2 is a sectional view of the brake taken in the plane of rotation indicated by line 2—2 of Fig. 1.
Figure 3:
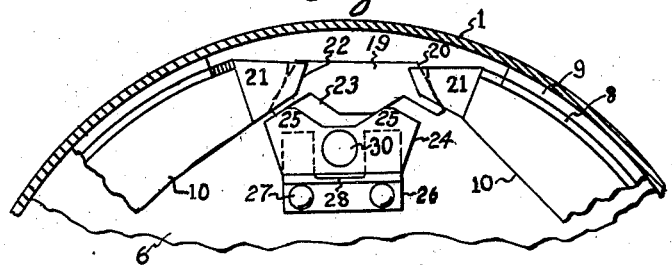
Fig. 3 is a fragmentary view of the torque-transmitting mechanism of the brake, taken in said plane of rotation and showing the parts in braking position.
Figure 4:
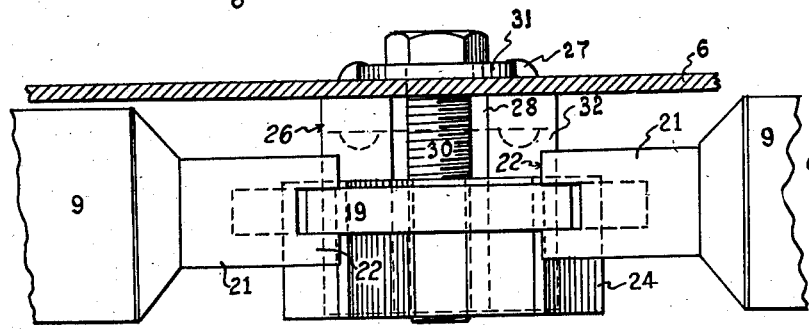
Fig. 4 is a cross sectional view on line 4—4 of Fig. 2, further showing the torque-transmitting mechanism.

In operation of the described brake, if the normal direction of drum rotation be indicated by the arrow in Fig. 2, then engagement of the shoes with the drum effected by the cam 16 will impose torque forces on the shoes acting in said direction. In responding to such forces, the right-hand shoe (Fig. 2) will return to its seat against the pin 12 and the left-hand shoe will force the wedge member 19 bodily to the right so far as the right-hand shoe permits, as Fig. 3 illustrates. In being thus shifted, the wedge member is cammed outwardly or toward the rim of the drum by the ridges 25 and hence is increasingly inserted between the pivotal ends of the shoes. Resistance offered to the combined circumferential and outward shifting of the wedge member is predetermined jointly by the slope of the cam ridges 25 and convergency of the edges 20, and said slope and convergency are so preselected that the block 24 will function to a desired extent as an anchorage for the left-hand shoe, permitting however a certain fraction of the torque imposed on such shoes to be transmitted through the wedge member to the right-hand shoe. Preferably the ridge inclinations and the wedge angle will be such as to adapt the block 24 to anchor the left-hand shoe to the extent of two-thirds of the torque applied to such shoe, the wedge member thus serving to transmit one third of such torque to the right-hand shoe. It is to be understood, however, that the ratio, two to three, is merely illustrative, the main essential of the ratio employed being that it shall achieve a substantial equalization of the braking efforts imposed on the drum by the two shoes. It will be understood that the block 24 serves effectively as an anchorage member since it resists torque stresses due to engagement of its rib 29 in the bracket channel 28.

When rotation of the drum is reverse to that indicated by the arrow (Fig. 2), the direction of floating travel of the wedge member is likewise reversed and the left-hand shoe receives one-third of the torque imposed on the right-hand shoe.

In compensating for wear, the screw 30 is rotated to draw the block 24 toward the backing plate and since said block rides on the cam faces 32, it is deflected toward the drum rim by such adjustment. The wedge member, since it seats on the block 24, is likewise shifted toward the drum rim, spreading the pivotal ends of the shoes and reducing clearance from the drum.

Figure 6:
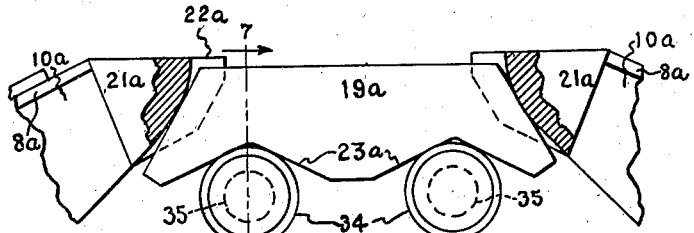
Fig. 6 is a fragmentary view similar to Fig. 3 but disclosing a modified torque-transmitting mechanism.
Figure 7:
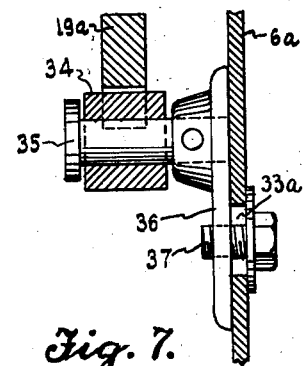
Fig. 7 is a sectional view of the modified mechanism taken on line 7—7 of Fig. 6.
Figure 5:
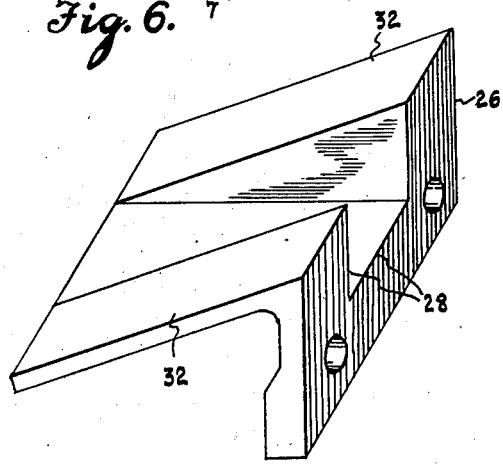
Fig. 5 is a perspective view of a bracket employed in the construction shown in Figs. 1-4.

Referring now to modification shown in Figs. 6 and 7, the shoes and wedge member 19a conform to preceding description, said shoes comprising band members 8a and web members 10a and the latter having thickened end portions 21a having lips 22a straddling the wedge member. The block 24 is eliminated, however, being replaced by rollers 34 which engage in the recesses 23a of the wedge member to seat the latter and are normally centered in said recesses as per Fig. 6. The rollers are journaled on pins 35 fixed in a bracket 36 clamped by bolts 37 to the backing plate 6a. The latter is formed with vertically elongated slots 33a to receive said bolts, while affording an outward adjustment of the bracket to compensate for wear.

In operation of the modified mechanism a manual application of the shoes to the drum results in a torque-induced circumferential travel of at least one of the shoes, such travel being imparted to the wedge member 19a. The latter rides on the rollers 34 and is deflected toward the drum rim due to the inclines forming the recesses 23a. In shifting toward the drum rim, the wedge member is increasingly inserted between the shoes. As in the first-described construction, the angularity of the recesses 23a and the angle of convergency of the shoe-engaging edges of the wedge member jointly set up a resistance to the described shifting of said member, predetermining the ratio in which torque applied to one of the shoes is transmitted jointly to the rollers 34 and to the other shoe. As a compensation for wear the bracket 36 may be outwardly adjusted on the backing plate.

Figure 8:
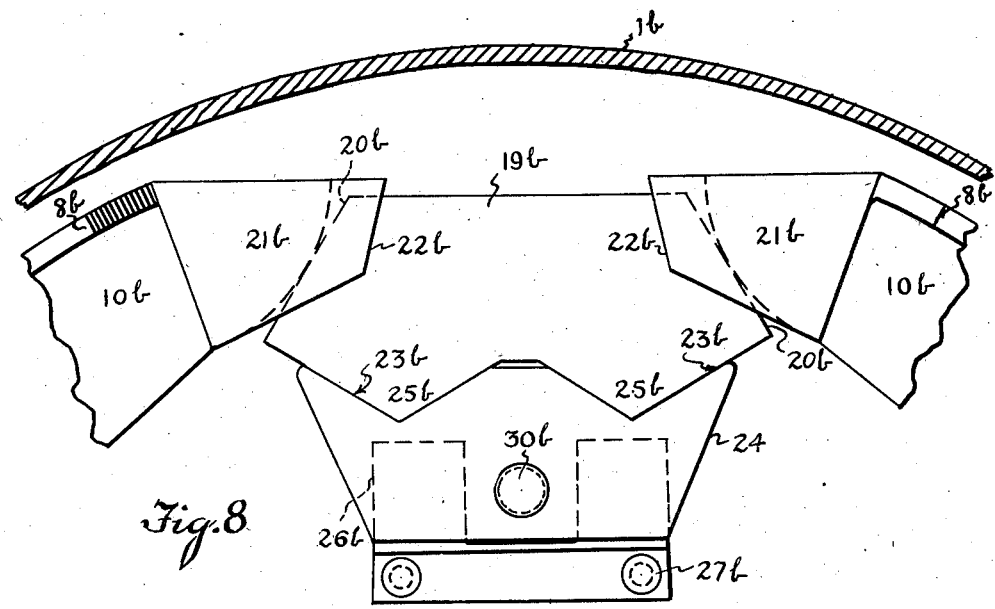
Fig. 8 is a fragmentary sectional elevational view similar to the top portion of Fig. 2 but showing a modification of the construction appearing in Fig. 2.

The further modification shown in Fig. 8, conforms to the construction appearing in Figs. 1-5, in adapting a brake drum 1b to be engaged by shoes, each comprising a web member 10b reinforcing an outer arcuate member 8b of band form. A torque-transmitting wedge member 19b is floatingly disposed between the shoes and convergent opposed faces 20b of such member receive the retractive thrust of the shoes. The shoes have thickened end portions 21b engaging the wedge member and said portions have lips 22b straddling the wedge member. The inner edge of the wedge member, instead of being recessed, as in Fig. 2, is formed with two similar inward projections 25b of approximately V-shape, and these serve to seat the wedge member on a metal block 24b having recesses 23b conforming to said projections. A bracket 26b which mounts said block, rivets 27b attaching the bracket to the backing plate, and the adjusting screw 30b all conform to the description of Figs. 1-5.

Figure 9:
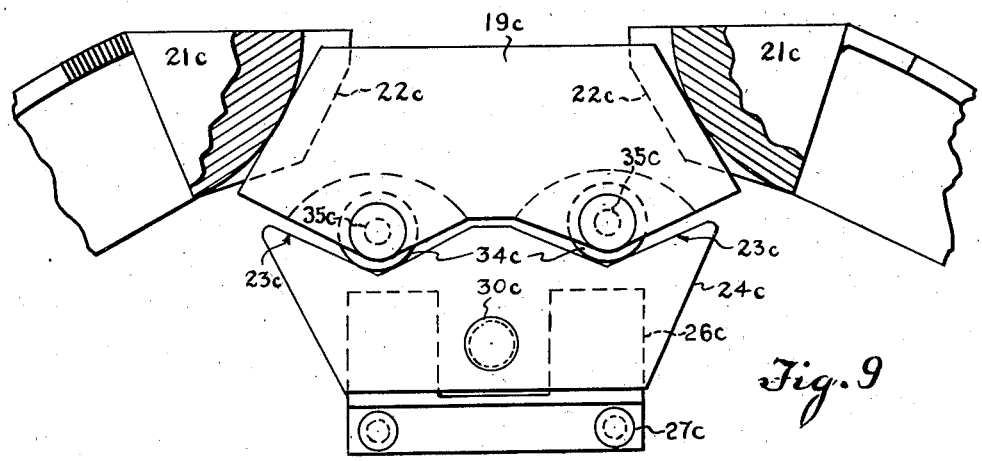
Fig. 9 is a similar fragmentary elevational view, partially in section, and illustrating a further modification.

The construction illustrated in Fig. 9 is similar to that shown in Figs. 6 and 7, using rollers 34c to reduce friction incident to floating actuation of the wedge member 19c. This construction, however, mounts the rollers by means of pins 35c upon the wedge member and the rollers seat upon a block 24c having approximate V-shaped recesses 23c in its outer face for engagement by the rollers. The block in turn seats on a bracket 26c riveted at 27c to the backing plate and a screw 30c adapts the block for adjustment as in the construction shown in Figs. 1–5. The shoes also conform to said construction as to their thickened portions 21c having lips 22c.

It is evident that resistance offered to increased insertion of the wedge member 19, 19a, 19b, or 19c between the shoes maintains a definite ratio to the torque, so that regardless of variations in the amount of torque, the described mechanism will continue to transmit a desired fraction of energy from the torque-impelled shoes to the companion shoe.

An important advantage of the described construction is that it permits a material decrease of either the force applied at a brake pedal or of the necessary pedal displacement, it being evident that this advantage must accrue when the braking force comprises a considerable torque-responsive factor instead of being entirely proportionate to and dependent on the pedal-applied force as in most present-day brakes. As compared to prior brakes of a floating shoe type, the shoe-spreading effect of the wedge member 19, 19a, 19b, or 19c reduces the travel required of the pedal.

The invention is presented as including such modifications and changes as come within the scope of the following claims.

What I claim is:

1. A brake comprising a brake drum, two brake shoes, interiorly engageable with the drum rim, means normally yieldably retracting the shoes from said rim, means associated with one of the shoes for applying it to the drum rim, a wedge member interposed between the shoes and presenting convergent faces to the shoes, such wedge member being free to float circumferentially of the brake for transmitting torque from said applied shoe to the adjacent shoe, and means for shifting the wedge member substantially radially responsive to its travel circumferential to the brake to increase its insertion between the shoes.

2. A brake comprising a brake drum, two brake shoes interiorly engageable with the drum rim, means normally yieldably retracting the shoes from said rim, means associated with one of the shoes for applying it to the drum rim, a wedge member interposed between the shoes and presenting convergent faces to the shoes, such wedge member being free to float circumferentially of the brake for transmitting torque from said applied shoe to the adjacent shoe, and means for automatically shifting said wedge responsive to its said floating travel and in a definite ratio to such travel to increase its insertion between said shoes and thus spread the shoes apart.

3. A brake comprising a brake drum, two brake shoes interiorly engageable with the drum rim, means normally yieldably retracting the shoes from said rim, means associated with one of the shoes for applying it to the drum rim, a wedge member interposed between the shoes and presenting convergent faces to the shoes, such wedge member being free to float circumferentially of the brake for transmitting torque from said applied shoe to the adjacent shoe, and an element in the path of said floating travel of the wedge adapted to deflect the wedge transversely of such travel and to thereby increase its insertion between the shoes.

4. In a brake as set forth in claim 1, spring means normally retracting the shoes, and reacting through the shoes on the wedge member in opposition to said shifting means.

5. In a brake as set forth in claim 1, means resiliently acting on the wedge member to predeterminedly resist its response to said shifting means.

6. In a brake as set forth in claim 1, means interengaging the wedge member and the two shoes to resist shifting of the wedge member relative to the shoes in a direction transverse to the rotational plane of the brake.

7. In a brake as set forth in claim 1, pairs of lips on the shoes straddling the wedge and resisting shifting of the wedge relative to the shoes in a direction transverse to the rotational plane of the brake.

8. In a brake as set forth in claim 1, means for adjusting the wedge radially of the brake and for retaining it in selective adjustment to compensate for frictional wear.

9. A brake as set forth in claim 1, the wedge-engaging faces of the shoes having approximately the same convergency as that of the wedge faces presented to the shoes.

10. A brake comprising a brake drum, two brake shoes interiorly engageable with the drum rim, at least one of said shoes being circumferentially floating, means normally yieldably retracting the shoes from said rim, means associated with said floating shoe for applying it to said rim, a wedge member interposed between the shoes and presenting to them faces converging toward the drum rim, a seating member for the wedge member positioned between the wedge member and the brake axis, one of said members having its face confronting the other formed with two recesses of shallow V shape, and elements projecting from the other member into said recesses, the wedge member being free to float circumferentially of the brake responsive to torque-induced travel of the floating shoe, and said recesses and elements projecting thereinto coacting to insert the wedge member increasingly between the shoes upon such circumferential floating of the wedge member.

11. In a brake as set forth in claim 10, said projecting elements being rollers, means journaling the rollers on the member from which they project.

12. A brake comprising a brake drum, two brake shoes interiorly engageable with the drum rim, at least one of said shoes being of a circumferentially floating type, means normally yieldably retracting the shoes from said rim, means associated with said floating shoe for applying it to said rim, a wedge member interposed between the shoes and presenting to them faces converged toward the drum rim, said wedge member being free to float circumferentially of the brake responsive to torque-induced travel of the floating shoe, a seating member for the wedge member positioned between the wedge member and the drum axis, said seating member having a provision for deflecting the wedge member toward the drum rim upon circumferential travel of the wedge member, and means for selectively adjusting the seating member toward the drum rim to increasingly insert the wedge member between the shoes in compensation for wear.

13. A brake as set forth in claim 12, the last-mentioned means comprising a bracket interposed between the seating member and the brake axis, and having a face seating the seating member and divergent to the brake axis and an adjusting screw, substantially parallel to said axis, threaded in the seating member and restrained from movement along its own axis.

CHARLES A. SAWTELLE.